United States Patent
Blackman et al.

(10) Patent No.: US 9,778,821 B2
(45) Date of Patent: Oct. 3, 2017

(54) METHODS AND SYSTEMS FOR MANAGING A GRAPHICAL INTERFACE

(71) Applicant: Citibank, N.A., New York, NY (US)

(72) Inventors: Andrew Robert Blackman, Surrey (GB); Alaa Abdulkhaleq Saeed, London (GB); David Niall O'Byrne, London (GB); Javier Anthony Diaz, London (GB)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 14/735,749

(22) Filed: Jun. 10, 2015

(65) Prior Publication Data

US 2016/0364089 A1    Dec. 15, 2016

(51) Int. Cl.
*G06F 3/0481* (2013.01)
*G06F 3/0484* (2013.01)
*G06T 13/80* (2011.01)
*G06F 3/0482* (2013.01)

(52) U.S. Cl.
CPC ........ *G06F 3/0482* (2013.01); *G06F 3/04817* (2013.01); *G06F 3/04842* (2013.01); *G06T 13/80* (2013.01)

(58) Field of Classification Search
CPC ....................................... G06F 3/048–3/04897
See application file for complete search history.

(56) References Cited

U.S. PATENT DOCUMENTS

| | | | | |
|---|---|---|---|---|
| 6,639,614 B1 * | 10/2003 | Kosslyn | ............. | G06T 11/206 345/440 |
| 7,516,419 B2 * | 4/2009 | Petro | ................ | G06F 3/0482 345/184 |
| 2007/0094597 A1 | 4/2007 | Rostom et al. | | |
| 2007/0265954 A1 | 11/2007 | Mather et al. | | |
| 2007/0271528 A1 * | 11/2007 | Park | ............. | G06F 3/0482 715/810 |
| 2008/0059913 A1 | 3/2008 | Burtner et al. | | |

(Continued)

FOREIGN PATENT DOCUMENTS

EP    2720127 A2    4/2014

OTHER PUBLICATIONS

Bohon, Cory. "Top 6 Mavericks Annoyances and How to Fix Them." MacILife. N.p., Oct. 28, 2013. Web. Sep. 17, 2015. <http://www.maclife.com/article/howtos/top_6_mavericks_annoyances_and_how_fix_them>.*

(Continued)

*Primary Examiner* — Jennifer To
*Assistant Examiner* — Liang Li
(74) *Attorney, Agent, or Firm* — John M. Harrington, Esq.; Johnson, Marcou & Isaacs, LLC

(57) ABSTRACT

Methods and systems for managing a graphical user interface involve, for example, one or more processors displaying on a display screen a visualization of a hub element defined in part by an arc-shaped boundary portion and defining a badge element within the visualization of the hub element. Thereafter, a radial menu element may be animated by the one or more processors for rotation to a position adjacent and extending radially from the arc-shaped boundary portion of the hub element and defined in part by an arc-shaped boundary portion of the radial menu element spaced apart from the arc-shaped boundary portion of the hub element.

16 Claims, 7 Drawing Sheets

(56) References Cited

U.S. PATENT DOCUMENTS

| | | | |
|---|---|---|---|
| 2008/0122796 A1* | 5/2008 | Jobs | G06F 3/0488 345/173 |
| 2008/0235602 A1 | 9/2008 | Strauss et al. | |
| 2011/0209093 A1* | 8/2011 | Hinckley | G06F 3/04817 715/834 |
| 2012/0081292 A1 | 4/2012 | Sirpal et al. | |
| 2013/0151963 A1 | 6/2013 | Costenaro et al. | |
| 2013/0173445 A1* | 7/2013 | Johnson | G06Q 40/04 705/37 |
| 2014/0092100 A1* | 4/2014 | Chen | G06F 3/0482 345/473 |
| 2014/0101576 A1* | 4/2014 | Kwak | G06F 3/0482 715/761 |
| 2014/0157200 A1* | 6/2014 | Jeon | G06F 3/0482 715/834 |
| 2017/0115693 A1* | 4/2017 | Li | G06F 3/0488 |

OTHER PUBLICATIONS

Soueidan, Sara. "Building a Circular Navigation with CSS Transforms." Codrops. Aug. 9, 2013. Web. Mar. 8, 2016. <http://tympanus.net/codrops/2013/08/09/building-a-circular-navigation-with-css-transforms/>.*

Hesselmann, Tobias, Stefan Floring, and Marwin Schmitt. "Stacked Half-Pie Menus—Navigating Nested Menus on Interactive Tabletops." YouTube, Nov. 29, 2011. Web. Mar. 8, 2016. <https://www.youtube.com/watch?v=nTPsXfqOIUw>.*

Woody, "Lazy Swipe—Simple Speed", https://play.google.com/store/apps/details?id=com.lazyswipe&hl=en, pp. 1-3., Jun. 2, 2015.

Extended European Search Report for European Patent Application No. 16169496.3, Oct. 20, 2016, 7.

* cited by examiner

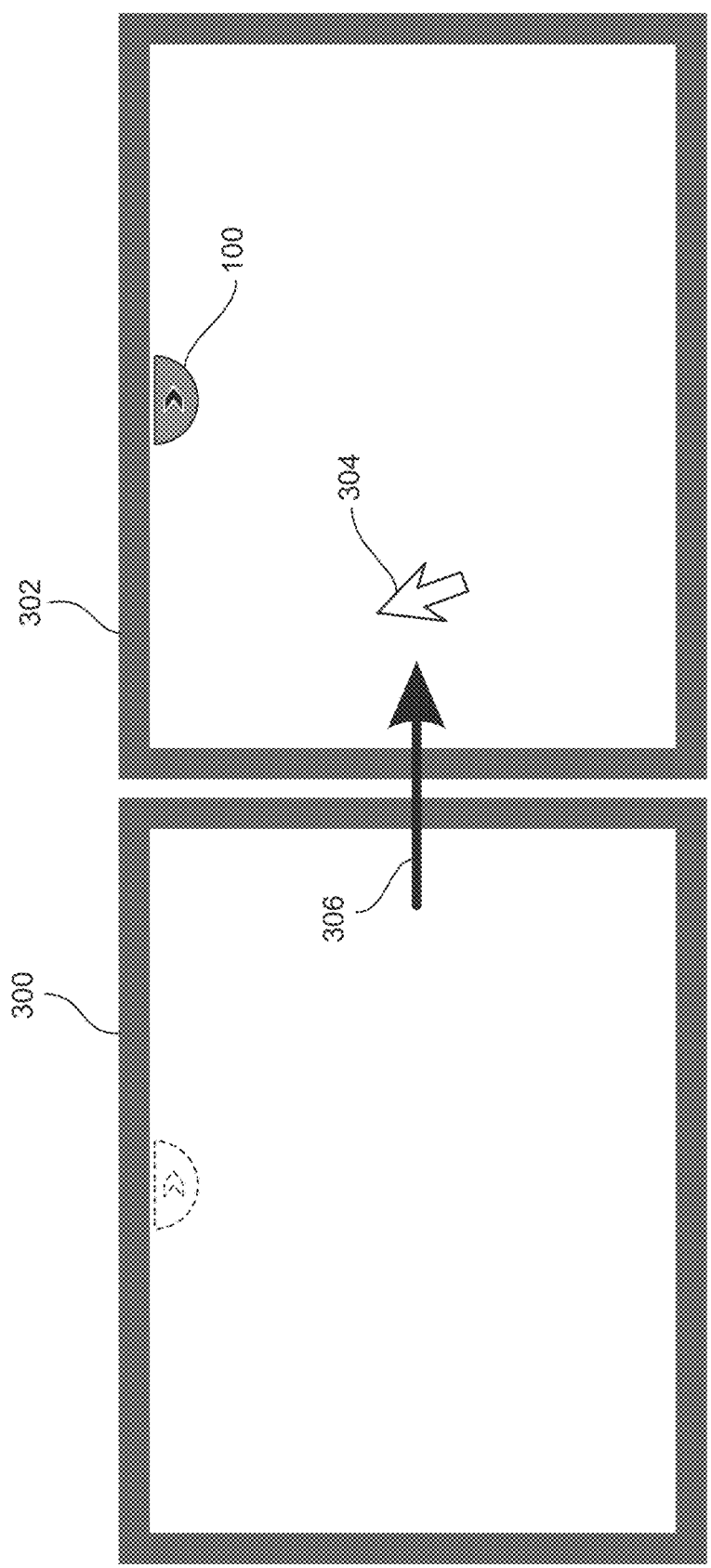

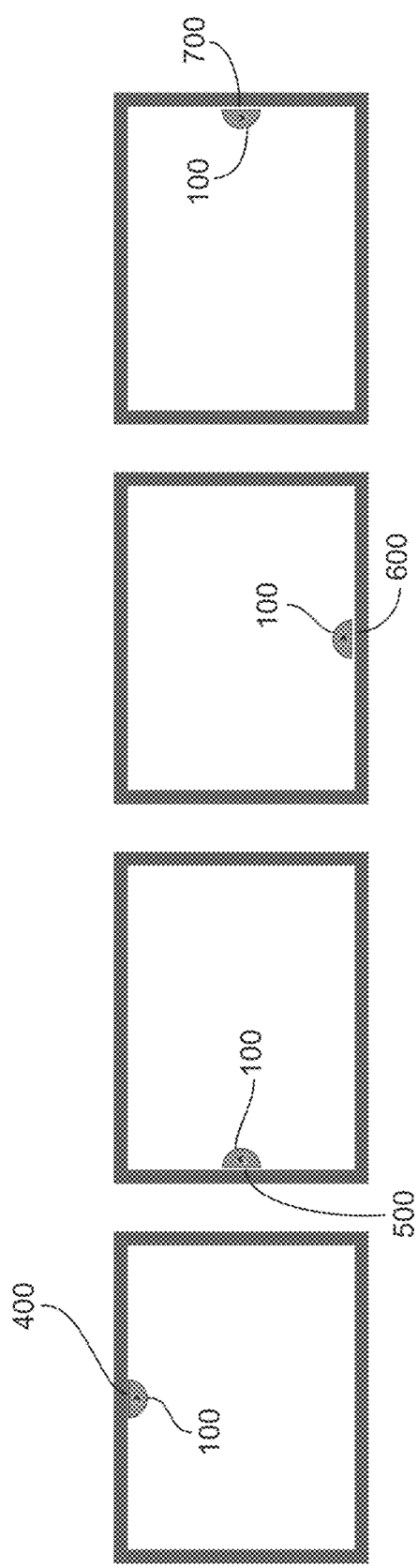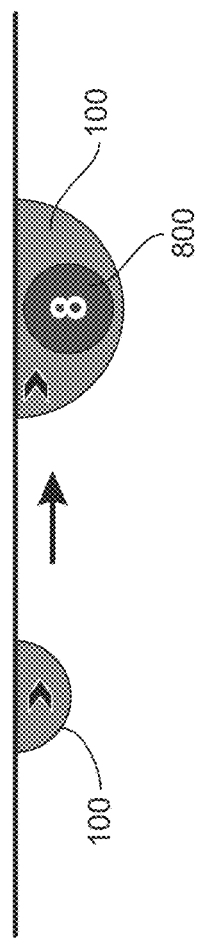

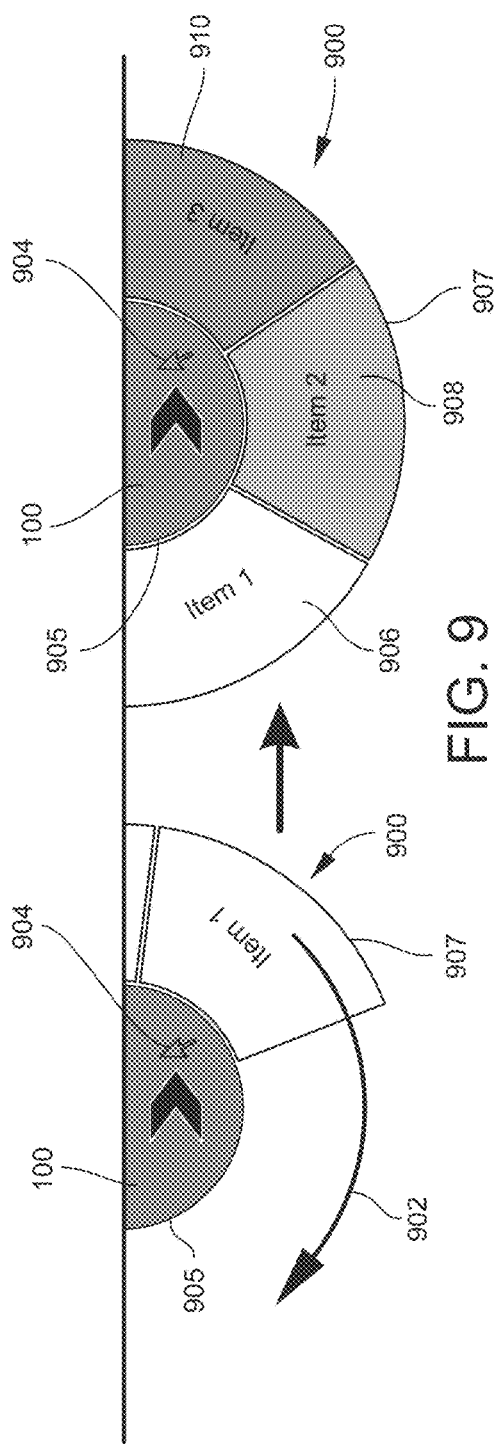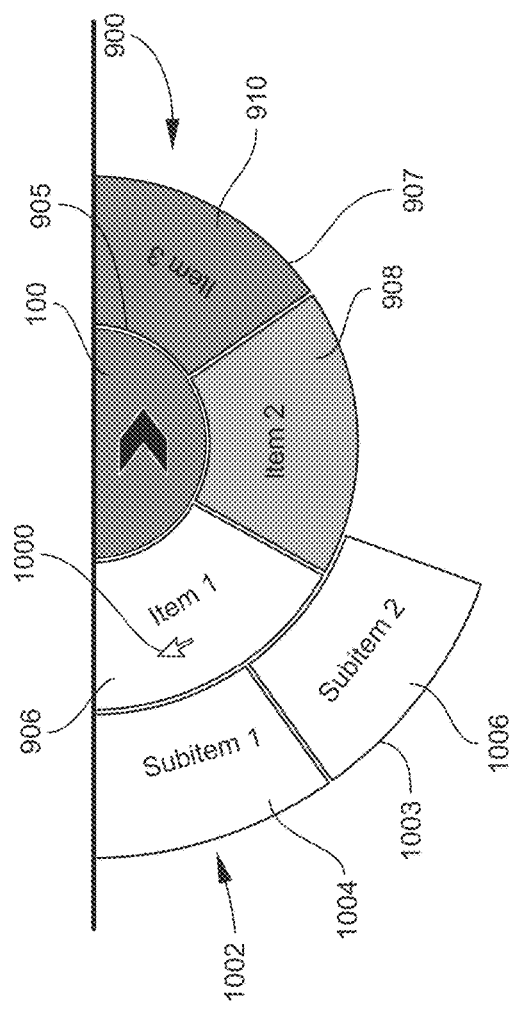
FIG. 9
FIG. 10

METHODS AND SYSTEMS FOR MANAGING A GRAPHICAL INTERFACE

FIELD OF THE INVENTION

The present invention relates generally to the field of computer interfaces, and more particularly to methods and systems managing a graphical interface displaying financial data, such as trading data.

BACKGROUND OF THE INVENTION

A current issue, for example, in electronic trading may be a lack of space on display screens of computing devices, such as desktop computers. For example, a user may have many windows open at the same time on a display screen, and each window may be fully populated to the extent of being very crowded with trade monitors, prices, spreadsheets, curves, charts, trade blotters, P&L information, and the like. When that bulk of information is stretched to include multiple systems, there is an even more serious lack of display screen space. Thus, it is not surprising that users may ultimately find that there is little or no space on their display screens for one or more additional products which they may wish to include. That is a problem for both providers, such as financial institutions, who want users' screen space for their products and the users who are unable to view all of the information they need.

Currently, a financial institution, such as a global bank, may provide a platform to its clients that delivers electronic access to the financial institution's capital markets services across equities, futures, FX, emerging markets, rates, credit, commodities, securities, municipals, prime, and research. Such a platform may allow clients of the financial institution ready access to proprietary data and analytics, financial institution research, and market commentary, as well as fast, seamless, and stable execution for FX and rates trade and a suite of sophisticated, post-trade analysis tools.

The platform may include features that provide a great deal of flexibility, such as windows and panes (e.g., parts of a sectioned window that provide additional information about a product) on a graphical display. For example, such platform may enable windows and panes to be created for different parts of a product allowing a user to create a flexible interface that enables the user to pick and choose what parts of the platform and/or what products the user actually wants to see on the user's display screen.

Such a platform may be very beneficial for the particular financial institution which may likely be in competition with others in the market for the limited space of the users' display screens. For example, users may generally have multiple applications from competing providers, including single-dealer or multi-dealer trading platforms, open on their screens at the same time and the platform's ability to have one window open at a time may allow the financial institution's platform to remain open on a user's display screen and allow such users, for example, to continue viewing and/or trading on the financial institution's platform.

However, users of the financial institution's platform may sometimes want to quickly launch a particular part of the financial institution's application. A user may have that particular part of the application in a user profile that the user may have already preset, but sometimes the user may want to easily access one product or visualize certain things or receive alerts, for example, when new axes or new trading information arrives. An "axe" is the interest that a person or trader shows in buying or selling a financial security. For example, if a trader holds a long position but has short-term concerns, that trader's "axe" toward short-term put options may be significant.

There is a need for a method and system for managing a graphical user interface that provides efficiency in the use of display screen space in a way that allows users, such as traders, a high degree of flexibility to customize their trading requirements around their day-to-day work requirements on their computing devices, such as their desktops, that is not possible using existing graphical interface presentation methods and systems.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the graphical management and display described herein.

Embodiments of the invention provide methods and systems for managing a graphical interface that may involve, for example, displaying, by one or more processors, on a first display screen, a visualization of a hub element defined in part by at least one arc-shaped boundary portion of said hub element; defining, by the one or more processors, a badge element within said visualization of the hub element; and animating, by the one or more processors, rotation of a first radial menu element to a position adjacent and extending radially from said at least one arc-shaped boundary portion of the hub element and defined in part by at least one arc-shaped boundary portion of said first radial menu element spaced apart from said at least one arc-shaped boundary portion of the hub element.

In an aspect of embodiments of the invention, displaying the visualization of the hub element may involve, for example, displaying the hub element in a first position with at least a second boundary portion of said hub element aligned to a first edge of the first display screen. In another aspect, displaying the visualization of the hub element may involve, for example, repositioning the hub element from said first position with said at least the second boundary portion of the hub element aligned to the first edge of the first display screen to a second position with said at least the second boundary portion of the hub element aligned to a second edge of the first display screen.

In an additional aspect of embodiments of the invention, displaying the visualization of the hub element may involve, for example, repositioning the hub element from the first display screen to a second display screen. In a further aspect, repositioning the hub element from the first display screen to the second display screen may involve, for example, repositioning the hub element from the first display screen to the second display screen responsive to a corresponding repositioning of a focus of a user input device from the first display screen to the second display screen. In another aspect, displaying the visualization of the hub element defined in part by said at least one arc-shaped boundary portion of said hub element may involve, for example, displaying a visualization of a semi-circular shaped hub element.

In a further aspect of embodiments of the invention, defining the badge element within said visualization of the hub element may involve, for example, defining an alert notification badge element within said visualization of the hub element. In a still further aspect, defining said alert notification badge element within the visualization of the hub element may involve, for example, displaying a numeric indicator of a number of received alert notifications within said alert notification badge element. In still another aspect, defining said alert notification badge element within the visualization of the hub element may involve, for example, resizing said hub element in proportion to a pre-defined level of urgency of at least one received alert notification.

In an additional aspect of embodiments of the invention, animating rotation of the first radial menu element may involve, for example, animating rotation of the first radial menu element to the position adjacent and extending radially from said arc-shaped boundary portion of the hub element responsive to a user input device hovering over said hub element. In another aspect, animating rotation of the first radial menu element may involve, for example, animating rotation of the first radial menu element displaying at least one first radial menu element menu item. In a further aspect, animating rotation of the first radial menu element may involve, for example, animating rotation of the first radial menu element displaying a plurality of first radial menu element menu items. In an additional aspect, animating rotation of the first radial menu element may involve, for example, animating rotation of the first radial menu element displaying a first radial menu element information item. In another aspect, animating rotation of the first radial menu element may involve, for example, animating rotation of the first radial menu element displaying a first radial menu element action item.

Another aspect of embodiments of the invention may involve, for example, animating rotation of a second radial menu element to a position adjacent and extending radially from said at least one arc-shaped boundary portion of the first radial menu element and defined in part by at least one arc-shaped boundary portion of the second radial menu element spaced apart from said at least one arc-shaped boundary portion of the first radial menu element. In a further aspect, animating rotation of the second radial menu element may involve, for example, animating rotation of the second radial menu element to a position adjacent and extending radially from said at least one arc-shaped boundary portion of the first radial menu element responsive to a user input device hover over a first radial menu item displayed on the first radial menu element. In an additional aspect, animating rotation of the second radial menu element may involve, for example, animating rotation of the second radial menu element displaying a plurality of second radial menu element menu items. In a still further aspect, animating rotation of the second radial menu element may involve, for example, animating rotation of the second radial menu element displaying a second radial element menu element information item. In another aspect, animating rotation of the second radial menu element may involve, for example, animating rotation of the second radial menu element displaying a second radial element menu element action item.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 3 illustrates an example of the widget visualization for embodiments of the invention following a user's cursor from one display screen to another;

FIGS. 4-7 illustrate examples of the widget visualization for embodiments of the invention positioned at different locations along the edges of a display screen;

FIG. 8 illustrates an example of the appearance of a badge and an increase in size of the widget visualization for embodiments of the invention;

FIG. 9 illustrates an example of a transition of the radial menu of the widget visualization for embodiments of the invention rotating into view;

FIG. 10 illustrates an example of the transition of a radial submenu of the widget visualization for embodiments of the invention rotating into view;

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide methods and systems for managing graphical interface displays, for example, for traders, that are highly flexible and that enable users to customize their requirements around their day-to-day work requirements on their desktops. Thus, embodiments of the invention provide a method of managing a graphical interface, for example, for a financial institution platform that is both a highly flexible and a very functional tool that provides a great improvement to the existing technology and adds considerable value for users.

Embodiments of the invention introduce a concept of a visualization of a widget which remains on a user's display screen at all times. A widget may be a small software application with limited functionality which appears on a display screen. The widget visualization for embodiments of the invention may provide, for example, an unobtrusive floating panel for displaying alerts, succinct data, and executing user interface actions. Thus, the widget visualization may provide a user an unobtrusive but clear way to display alerts and succinct data, as well as user interface actions via one or more radial menus.

Figure 1:
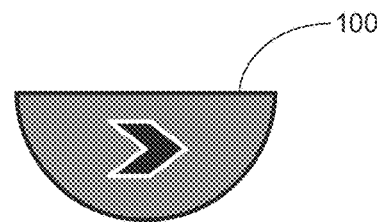
FIG. 1 illustrates an example of a display of a widget visualization for embodiments of the invention.
Figure 2:
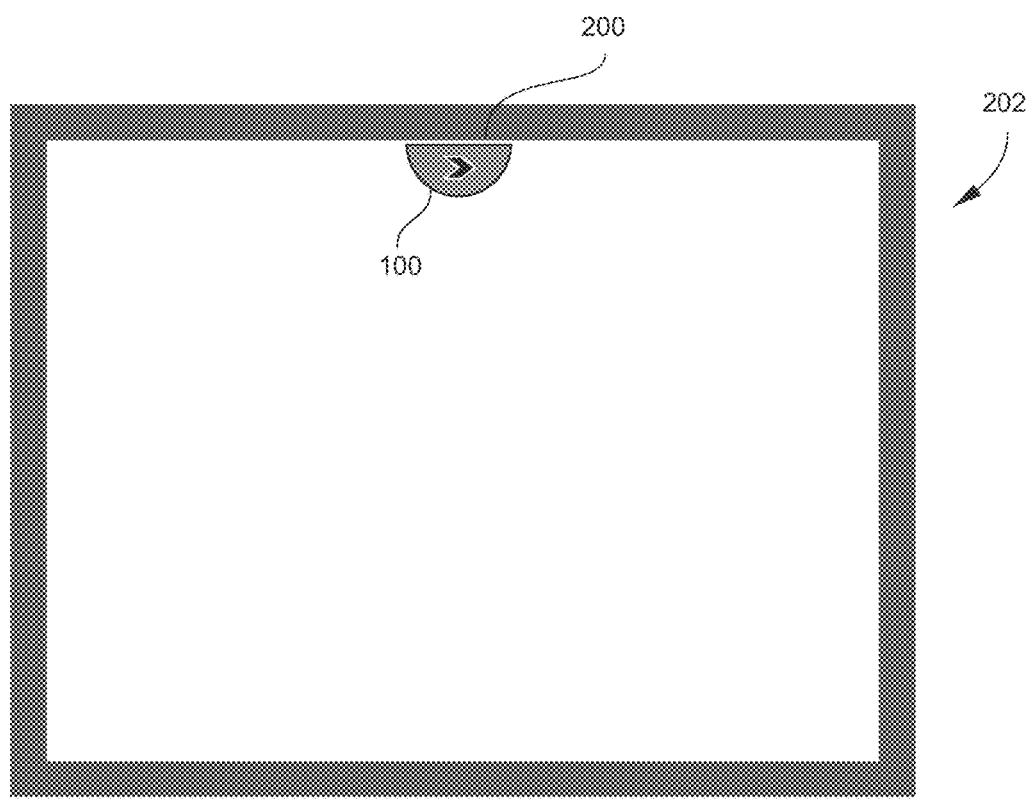
FIG. 2 illustrates an example of a display of the widget visualization for embodiments of the invention aligned with any part of the edge of a display screen.

FIG. 1 illustrates an example of a display of a widget visualization 100 for embodiments of the invention, and FIG. 2 illustrates an example of a display of the widget visualization 100 for embodiments of the invention aligned with part of an edge 200 of a display screen 202. Referring to FIGS. 1 and 2, as noted, the widget visualization 100 may appear, for example, as a small, simple, semi-circular window, which is aligned to the edge 200 of a user's display screen 202. The user may, for example, choose a location at which the user wishes to place the widget visualization 100 on the user's display screen.

The widget visualization 100 for embodiments of the invention may allow the user to do several different things. For example, the visualization 100 may allow the user to quickly launch any part of the financial institution's platform which the user wishes to launch, such as a product, an axe monitor, or the user's profile. For another example, the widget visualization 100 for embodiments of the invention may allow the user to receive alerts. Thus, if traders are posting new axes, for example, the user may be presented immediately with an alert message on the widget visualization 100.

It is not necessary, for example, for a user to have the financial institution's platform displayed prominently on the user's display screen. Instead, the small, unobtrusive widget visualization 100 for embodiments of the invention located somewhere on the user's display screen may provide alert messages. As an additional example, the visualization 100 may provide users a visualization, for example, of open orders which the users may have with the financial institution's platform in a quick and easy way.

A user may launch the visualization 100 for embodiments of the invention, for example, from a preferences menu of the financial institution's platform. For this purpose, a separate preferences menu may be provided specifically for the widget visualization 100. Using the preferences menu, users may define how they want to use the widget visualization 100 for embodiments of the invention. The widget visualization 100 may be customizable, for example, so that users may define exactly what items they want to launch from the widget visualization 100, such as particular alerts.

Once a user defines how the user wishes to use the widget visualization 100 for embodiments of the invention, the user may then decide where he or she wants the widget to be displayed on the user's display screen. For example, users of the financial institution's platform may typically have more than one display screen and may employ a movable indicator, such as a mouse cursor, on the screens to identify a point on one of the screens that may be affected by input from the user. A user with multiple screens may set a preference, for example, for the widget visualization 100 for embodiments of the invention to follow the user's mouse cursor from one display screen onto another "active" display screen (i.e. the screen where the cursor is currently located).

FIG. 3 illustrates an example of the widget visualization 100 for embodiments of the invention following a user's cursor from one display screen to another. Thus, if the user has multiple screens, such as screens 300 and 302 open, as the user moves his or her cursor 304, for example, in arrow direction 306 from one screen 300 to another screen 302, the particular preference may cause the widget visualization 100 for embodiments of the invention to follow the cursor 304 as the user moves his or her cursor from screen to screen and remain within the user's field of view.

On the other hand, if a user does not want to use that particular preference, the user may drag or configure the widget visualization for embodiments of the invention to be positioned at any part of any edge of a single display screen, such as the user's principal display screen. FIGS. 4-7 illustrate examples of the widget visualization 100 for embodiments of the invention positioned at different locations on a display screen. Thus, the widget visualization may be pinned to a top edge 400 as shown in FIG. 4, a left edge 500 as shown in FIG. 5, a bottom edge 600 as shown in FIG. 6, or a right edge 700 as shown in FIG. 7 of the display screen regardless of where the user may move his or her mouse cursor.

The widget visualization 100 for embodiments of the invention may provide a radial menu. Typically, as shown in FIGS. 4-7, the widget visualization 100 may sit on the top 400, left 500, bottom 600 or right 700 edge of the user's display screen. In addition, the widget visualization 100 may provide an area where a "badge" may be shown. FIG. 8 illustrates an example of the appearance of a badge 800 and an increase in size of the widget visualization 100 for embodiments of the invention. The badge 800 may be used, for example, to indicate that there are a number of new messages or alerts, such as eight new messages or alerts as shown in FIG. 8. As shown in FIG. 8, the widget visualization 100 for embodiments of the invention may increase in size slightly and/or change colour to accommodate the badge 800 and signify the importance and/or type of new alerts.

When a user moves the user's mouse cursor over the widget visualization for embodiments of the invention, a radial menu may rotate into position. FIG. 9 illustrates an example of a transition of the radial menu 900 of the widget visualization for embodiments of the invention rotating into view, for example, in arrow direction 902. Referring to FIG. 9, the radial menu element 900 extends radially from the arc-shaped boundary portion 905 of the hub element 100 and is defined in part by an arc-shaped boundary portion 907 of the radial menu element 900 spaced apart from the arc-shaped boundary portion 905 of the hub element 100. Thus, when a user moves his or her cursor 904 to hover over the widget visualization 100, the widget visualization may increase in size in a radial fashion as the radial menu 900 rotates in arrow direction 902 into position. In addition, referring to FIG. 9, depending on what preferences the user may have set, multiple items, such as radial menu items 906, 908, and 910, may appear on the radial menu 900 of the widget visualization 100. It is to be understood that while three radial items, 906, 908, and 910 are depicted in the example of FIG. 9, any smaller or larger number of radial menu items may appear on the radial menu 900.

In order to learn more about one of the radial menu items, such as items 906, 908, and 910 shown in FIG. 9, the user may move the user's mouse cursor to hover over one of the radial menu items and be presented with a rotation of a radial submenu into view. FIG. 10 illustrates an example of the transition of a radial submenu of the widget visualization 100 for embodiments of the invention rotating into view. Referring to FIG. 10, for example, when the user moves the user's cursor 1000 to hover over one of the radial menu items, such as radial menu item 906, a radial submenu 1002 of any number of radial submenu items, such as radial submenu items 1004 and 1006, may rotate into view. Referring further to FIG. 10, the radial submenu 1002 extends radially from the arc-shaped boundary portion 907 of the radial menu element 900 and is defined in part by an arc-shaped boundary portion 1003 of the radial submenu element 1002 spaced apart from the arc-shaped boundary portion 907 of the radial menu element 900. It is to be understood that while two radial submenu items 1004 and 1006 are depicted in the example of FIG. 10, any smaller or larger number of radial submenu items may appear on the radial submenu 1002.

Figure 11:
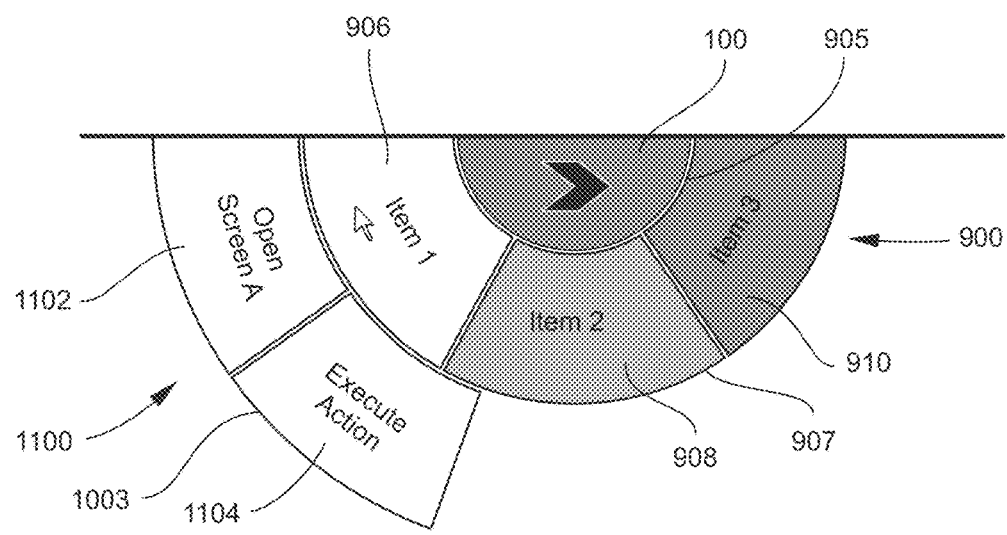
FIGS. 11 and 12 illustrate examples of radial sub-menu items of the widget visualization for embodiments of the invention.
Figure 12:
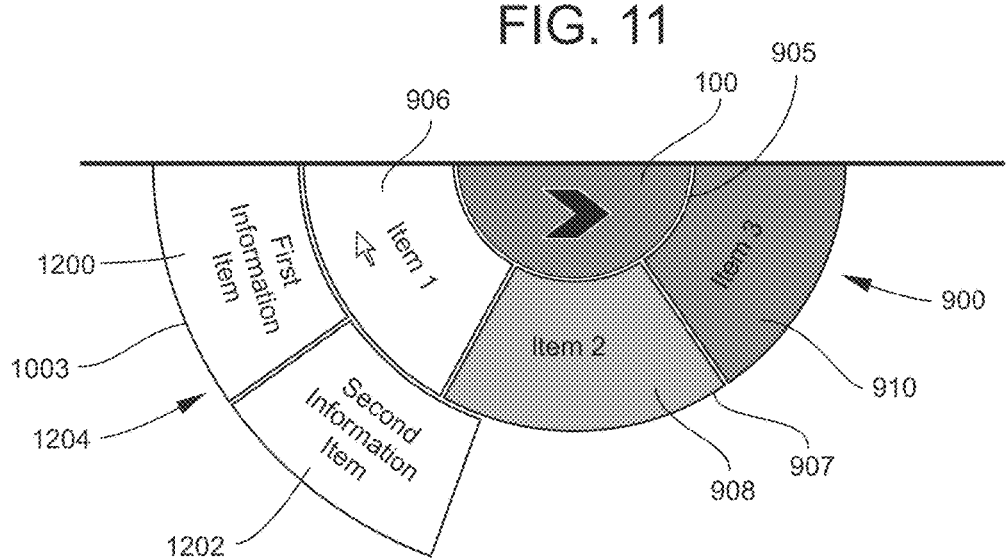

A user may be able to obtain any number of actions from menu items on the radial menu and submenu of the widget visualization 100 for embodiments of the invention. For example, menu items on the radial submenu may simply display data, or may be configured to execute actions when clicked on. FIGS. 11 and 12 illustrate examples of radial sub-menu items of the widget visualization 100 for embodiments of the invention. Referring to FIG. 11, an item of a submenu, such as submenu 1100, may include a submenu item, such as submenu item 1102 that may be configured to perform an action, such as open a screen, and another submenu item, such as submenu item 1104 may be configured to perform or execute another action. Further, a user may launch a part of the financial institution's platform, such as a chart or order form from a radial sub-menu item of the widget visualization 100. Referring to FIG. 12, a user may simply retrieve information using menu items, such as radial submenu items 1200 and 1202, on the radial sub-menu 1204 of the widget visualization 100 for embodiments of the invention. A user may also display, for example, graphical data or text data using one of the radial sub-menu items 1200 and 1202 of the widget visualization 100.

The widget visualization 100 for embodiments of the invention may include, for example, a quick launcher preference aspect by which a user may define particular parts of the financial institution's platform that the user may wish to launch first. Thus, the parts which the user may wish to launch first may be displayed as the first item on graphical representations of the radial menu. For example, when a user defines a preference to launch an order form or a dashboard of the financial institution's platform first, the order form or dashboard may appear, for example, on the radial menu or submenu of the widget visualization for embodiments of the invention.

An alerts aspect of the widget visualization for embodiments of the invention may involve any number of different types of alerts. Such alerts may include, for example, alerts regarding publishing of a tradable axe or a chat message. In the alert aspect, a number that indicates the number of alerts awaiting the user's attention may appear on the hub or main body portion of the widget visualization, and radial menu items and sub-items may display a "badge" to show a more detailed breakdown of the alerts. As previously noted with reference FIG. 8, the badge 800 may be used, for example, to indicate the number of new messages or alerts, such as eight new messages or alerts as shown in FIG. 8, awaiting a user's attention. As new alerts are received, the number within the badge 800 of the widget visualization 100 that indicates the number of alerts awaiting the user's attention may be increased by the number of newly received alerts and the size and colour of the badge 800 may increase slightly and/or change to reflect number and type of alerts.

Figure 13:
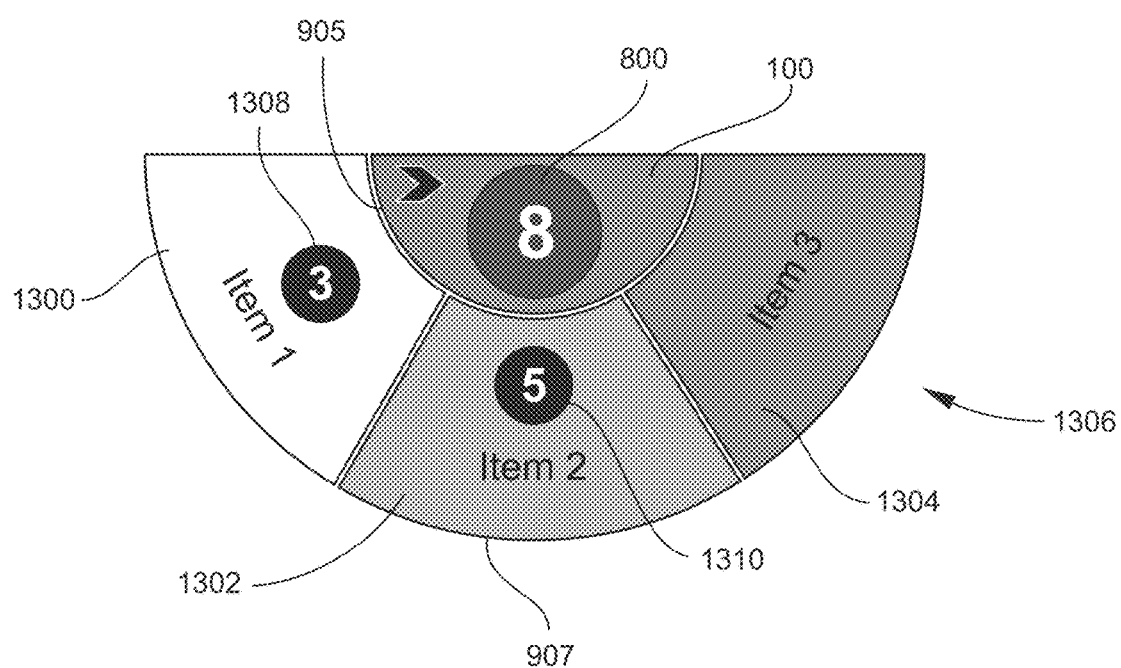
FIG. 13 illustrates an example of menu items of a radial menu of the widget visualization for embodiments of the invention displaying numbers on radial menu item badges that indicate a number of alerts that pertain to the particular menu items.

In addition, each menu item of the radial menu, may display a radial menu item badge that indicates a number of alerts that pertain to the particular radial menu item. FIG. 13 illustrates an example of menu items, such as menu items 1300 and 1302, of a radial menu 1306 of the widget visualization 100 for embodiments of the invention displaying numbers, such as the numbers "3" and "5", respectively, on radial menu item badges 1308 and 1310 that indicate a number of alerts that pertain to the particular menu items.

Referring to FIG. 13, when a user hovers the user's cursor over one of the items of the radial menu 1306 of the widget visualization 100 for embodiments of the invention, such as radial menu item 1302 showing the number "5" representing five alerts, each of the five alerts may be launched individually. Thus, the user may launch each of the five alerts on radial sub-menu item 1302 by causing the user's cursor to hover over the radial menu item 1302 displaying the number "5". Thereupon, each of the five alerts may be displayed radially from left to right on items of a radial sub-menu centered below radial menu item 1302 displaying the number "5".

In the event all of the five alerts cannot fit because of a space restriction, the alerts on the far right and far left of the radial sub-menu items may be displayed in truncated form followed, for example, by an indicator, such as a series of dots, to indicate that additional text of the alert is available. In order to display the entire alert for those truncated items, the user may cause the user's cursor to hover over one of those truncated items.

Further, the alerts may be displayed on a radial sub-menu item in a scrollable window to overcome the size limitation of the radial sub-menu item. It is to be understood that any number of alerts may thus be accommodated by the widget visualization 100. It is to be further understood that embodiments of the invention may include any number of radial menus in addition to the radial menus and radial sub-menus of the foregoing examples. It is also to be understood that each radial submenu item, such as radial submenu items 1004 and 1006 depicted in the example of FIG. 10, may itself have its own submenu items.

Figure 14:
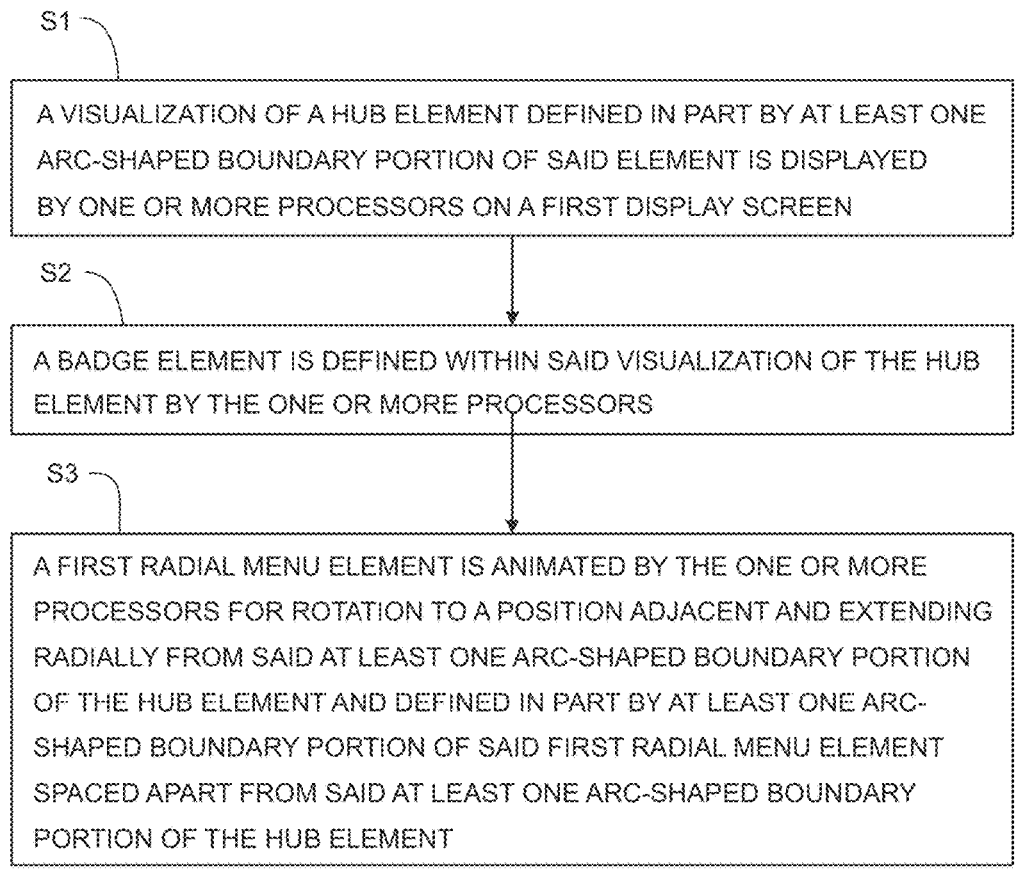
FIG. 14 is a flow chart that illustrates an overview example of a process for managing a graphical user interface for embodiments of the invention.

FIG. 14 is a flow chart that illustrates an overview example of a process for managing a graphical user interface for embodiments of the invention. Referring to FIGS. 9 and 14, at S1, a visualization of a hub element 100 defined in part by an arc-shaped boundary portion 905 of the hub element 100 is displayed by one or more processors on a first display screen. At S2, a badge element 800, as shown in FIG. 8, is defined within the visualization of the hub element 100 by the one or more processors. At S3, a first radial menu element 900 is animated by the one or more processors for rotation to a position adjacent and extending radially from the arc-shaped boundary portion 905 of the hub element 100 and defined in part by an arc-shaped boundary portion 907 of the first radial menu element 900 spaced apart from the arc-shaped boundary portion 905 of the hub element 100. In addition, referring to FIG. 10, in some embodiments, a second radial menu element 1002 may be animated for rotation to a position adjacent and extending radially from the arc-shaped boundary portion 907 of the first radial menu element 900 and defined in part by an arc-shaped boundary portion 1003 of the second radial menu element 1002 spaced apart from the arc-shaped boundary portion 907 of the first radial menu element 900.

It is to be understood that the application code for embodiments of the invention may be built, for example, in multiple layers using any programming language to allow its flexibility. It is to be further understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network.

Embodiments of the invention may employ client devices that may each comprise a computer-readable medium, including but not limited to, random access memory (RAM) coupled to a processor. The processor may execute computer-executable program instructions stored in memory.

Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method for managing a graphical user interface, comprising:

displaying, by one or more processors, on a first display screen, a visualization of a widget application hub element defined in part by at least one arc-shaped boundary portion of said hub element, said hub element occupying an area on the first display screen that is not greater than 5 percent of a total area of the display screen;

defining, by the one or more processors, a badge element within said visualization of the hub element;

animating, by the one or more processors, rotation of a first radial menu element having a leading edge moving from a position aligned with a first edge of the first display screen in an arcuate path along said at least one arc-shaped boundary portion of said hub element to a position adjacent and extending radially from said at least one arc-shaped boundary portion of the hub element and said first radial menu element being defined in part by said leading edge and by at least one arc-shaped boundary portion of said first radial menu element spaced apart from said at least one arc-shaped boundary portion of the hub element;

animating, by the one or more processors, rotation of a second radial menu element having a leading edge moving from a position aligned with said first edge of the display screen in an arcuate path along said at least one arc-shaped boundary portion of said first radial menu element spaced apart from said at least one arc-shaped boundary portion of the hub element to a position adjacent and extending radially from said at least one arc-shaped boundary portion of the first radial menu element spaced apart from said at least one arc-shaped boundary portion of the hub element and defined in part by at least one arc-shaped boundary portion of the second radial menu element spaced apart from said at least one arc-shaped boundary portion of the first radial menu element;

launching, by the one or more processors, at least one entity platform application from at least one of said radial menu elements;

wherein displaying the visualization of the hub element defined in part by said at least one arc-shaped boundary portion of said hub element further comprises displaying a visualization of a semi-circular shaped hub element;

wherein defining the badge element within said visualization of the hub element further comprises defining an alert notification badge element within said visualization of the hub element; and wherein defining said alert notification badge element within the visualization of the hub element further comprises displaying a numeric indicator of a number of received alert notifications within said alert notification badge element.

2. The method of claim 1, wherein displaying the visualization of the hub element further comprises displaying the hub element in a first position with at least a second boundary portion of said hub element aligned to a first edge of the first display screen.

3. The method of claim 2, wherein displaying the visualization of the hub element further comprises repositioning the hub element from said first position with said at least the second boundary portion of the hub element aligned to the first edge of the first display screen to a second position with said at least the second boundary portion of the hub element aligned to a second edge of the first display screen.

4. The method of claim 1, wherein displaying the visualization of the hub element further comprises repositioning the hub element from the first display screen to a second display screen.

5. The method of claim 4, wherein repositioning the hub element from the first display screen to the second display screen further comprises repositioning the hub element from the first display screen to the second display screen responsive to a corresponding repositioning of a focus of a user input device from the first display screen to the second display screen.

6. The method of claim 1, wherein defining said alert notification badge element within the visualization of the hub element further comprises resizing said hub element in proportion to a pre-defined level of urgency of at least one received alert notification.

7. The method of claim 6, wherein animating rotation of the first radial menu element further comprises animating rotation of the first radial menu element displaying at least one first radial menu element menu item.

8. The method of claim 6, wherein animating rotation of the first radial menu element further comprises animating rotation of the first radial menu element displaying a plurality of first radial menu element menu items.

9. The method of claim 6, wherein animating rotation of the first radial menu element further comprises animating rotation of the first radial menu element displaying a first radial menu element information item.

10. The method of claim 6, wherein animating rotation of the first radial menu element further comprises animating rotation of the first radial menu element displaying a first radial menu element action item.

11. The method of claim 1, wherein animating rotation of the first radial menu element further comprises animating rotation of the first radial menu element to the position adjacent and extending radially from said arc-shaped boundary portion of the hub element responsive to a user input device hover over said hub element.

12. The method of claim 1, wherein animating rotation of the second radial menu element further comprises animating rotation of the second radial menu element to a position adjacent and extending radially from said at least one arc-shaped boundary portion of the first radial menu element responsive to a user input device hover over a first radial menu item displayed on the first radial menu element.

13. The method of claim 1, wherein animating rotation of the second radial menu element further comprises animating rotation of the second radial menu element displaying a plurality of second radial menu element menu items.

14. The method of claim 1, wherein animating rotation of the second radial menu element further comprises animating rotation of the second radial menu element displaying a second radial element menu element information item.

15. The method of claim 1, wherein animating rotation of the second radial menu element further comprises animating rotation of the second radial menu element displaying a second radial element menu element action item.

16. A system for managing a graphical user interface, comprising:
  a processor coupled to memory, the processor being programmed for:
  displaying, on a first display screen, a visualization of a widget application hub element defined in part by at least one arc-shaped boundary portion of said hub element, said hub element occupying an area on the first display screen that is not greater than 5 percent of a total area of the display screen;
  defining a badge element within said visualization of the hub element; and
  animating rotation of a first radial menu element having a leading edge moving from a position aligned with a first edge of the first display screen in an arcuate path along said at least one arc-shaped boundary portion of said hub element to a position adjacent and extending radially from said at least one arc shaped boundary portion of the hub element and said first radial menu element being defined in part by said leading edge and by at least one arc-shaped boundary portion of said first radial menu element spaced apart from said at least one arc-shaped boundary portion of the hub element;
  animating rotation of a second radial menu element having a leading edge moving from a position aligned with said first edge of the display screen in an arcuate path along said at least one arc-shaped boundary portion of said first radial menu element spaced apart from said at least one arc-shaped boundary portion of the hub element to a position adjacent and extending radially from said at least one arc-shaped boundary portion of the first radial menu element spaced apart from said at least one arc-shaped boundary portion of the hub element and defined in part by at least one arc-shaped boundary portion of the second radial menu element spaced apart from said at least one arc-shaped boundary portion of the first radial menu element;
  launching, by the one or more processors, at least one entity platform application from at least one of said radial menu elements;
  wherein displaying the visualization of the hub element defined in part by said at least one arc-shaped boundary portion of said hub element further comprises displaying a visualization of a semi-circular shaped hub element;
  wherein defining the badge element within said visualization of the hub element further comprises defining an alert notification badge element within said visualization of the hub element; and
  wherein defining said alert notification badge element within the visualization of the hub element further comprises displaying a numeric indicator of a number of received alert notifications within said alert notification badge element.

* * * * *